June 20, 1933.   A. B. SHULTZ   1,914,677
SHOCK ABSORBER
Filed Dec. 28, 1928

Inventor
Albert B. Shultz
By Pope & Powers
Attorneys

Patented June 20, 1933

1,914,677

UNITED STATES PATENT OFFICE

ALBERT B. SHULTZ, OF BUFFALO, NEW YORK, ASSIGNOR TO HOUDE ENGINEERING CORPORATION, OF BUFFALO, NEW YORK, A CORPORATION OF NEW YORK

SHOCK ABSORBER

Application filed December 28, 1928. Serial No. 328,880.

This invention relates to a shock absorber of the type in which a liquid such as oil is used as the medium for resisting the relative movement of parts, such absorbers being more particularly designed for use on automobiles, although the same may also be used for other purposes.

It has been found that the liquid in shock absorbers is more limpid and flows more freely during warm or summer time, while in cold or winter time the liquid congeals and flows more sluggishly, with the result that the operation of the shock absorber is not absolutely uniform during variations of temperature or weather conditions.

The object of this invention is the provision of simple, efficient and reliable means for thermostatically controlling the flow of the resistance liquid in the instrument in response to variations in viscosity or limpidity, so that when the liquid becomes thinner in warm weather the flow of the same will be restricted and when it becomes thicker in cold weather the flow of the same will be with greater freedom, thereby adapting the rate of flow of the liquid while the instrument is in operation in accordance with the temperature and viscosity of the fluid and ensuring uniform operation of the absorber at all times.

In the accompanying drawing:—

Similar reference characters indicate like parts in the several figures of the drawing.

Figure 1:
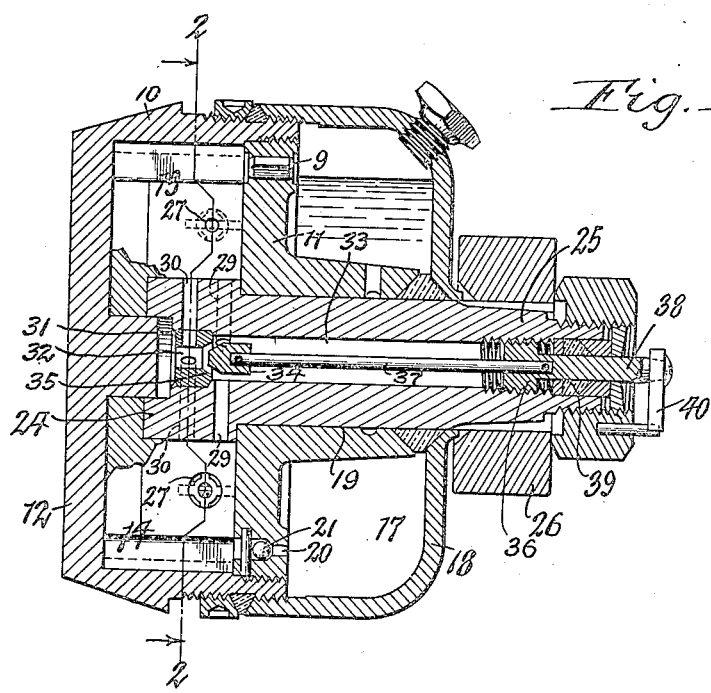
Figure 1 is a longitudinal section taken on line 1—1 Fig. 2, of a shock absorber embodying an acceptable form of my invention.

The body of this instrument is preferably constructed of steel or iron and comprises a cylindrical wall 10, front and rear transverse walls 11, 12 and a partition consisting of two diametrical sections 13, 14 which divide the space between the walls into two semi-cylindrical pressure chambers 15, 16.

The resistance liquid, such as oil, is supplied to the pressure chambers from an oil supplying and replenishing reservoir 17 arranged in front of the pressure chamber and formed within a shell 18 which in effect constitutes a forward extension of the body.

On its central part the front wall 11 of the body is provided with a bearing 19 which preferably extends forwardly to the front wall of the shell of the replenishing reservoir.

The oil or other liquid is permitted to pass from the lower part of the replenishing reservoir into the lower parts of the pressure chamber through a port 20 in the lower part of the wall 11 which contains a check valve 21 closing toward the replenishing reservoir, and some of the liquid and air under pressure in the pressure chamber are permitted to return from the pressure chambers into the replenishing reservoir through vent openings 9 in the upper part of the wall 11.

Within the pressure chambers are arranged two oscillatory pistons 22, 23 of ferrous metal which are arranged on opposite sides of an integral hub 24 which turns between the two sections 13, 14 of the partition, and this hub is provided with an integral shaft 25 which extends forwardly through the bearing 19 and is journaled therein. At its front end outside of the reservoir the shaft has secured thereto an operating arm or rock lever 26 which is adapted to be connected with one of the relatively movable parts, while the body is adapted to be secured to the other relatively movable part of the automobile or other installation which is to be protected against undue shock.

Figure 2:
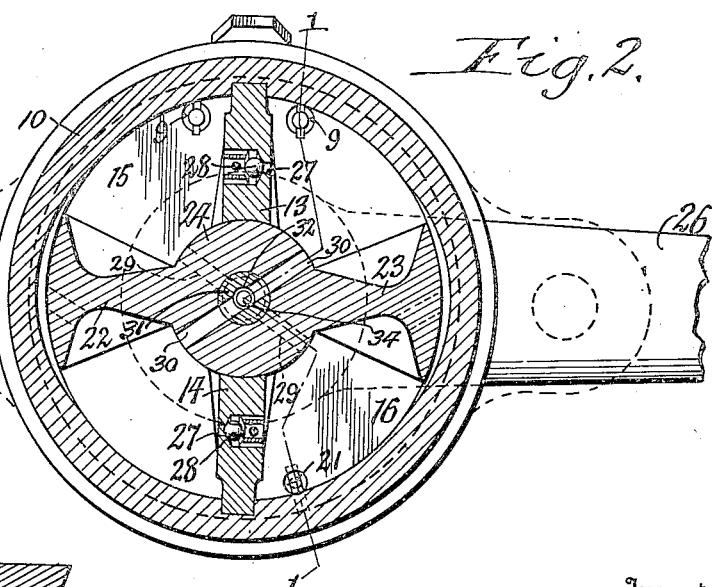
Figure 2 is a cross section of the same taken on line 2—2 Fig. 1.

During the contra-clockwise movement of the pistons (Fig. 2) which occurs, for example when the springs of the car are compressed and the axle and body of the same approach each other, the resistance liquid is permitted to pass with comparative freedom from the low pressure end of one pressure chamber to the high pressure end of the other pressure chamber through ports 27 which contain check valve 28 opening toward the high pressure ends of these chambers, but during forward strokes of these pistons which occur during rebound of the car springs and separation of the axle and body thereof, then the check valves 28 close toward the low pressure ends of the pressure chamber and thereby prevent the free escape of the liquid at this time and instead compelling the same to offer greater resistance to the forward movement of the piston, whereby the shock at this time is absorbed.

In order to prevent the resistance liquid from being absolutely trapped in the high pressure ends of the pressure chambers high and low pressure by-passes 29, 30 are provided which permit a limited amount of the resistance liquid to pass back and forth between the high and low pressure ends of the pressure chambers, the high pressure by-passes 29 being formed partly in the hub and partly in a steel bushing 31 in the hub of the pistons, and extending from the periphery of the hub to the bore 32 of the bushing, and the low pressure by-passes 30 being formed in the hub and extending from the periphery of the hub to a longitudinal bore or passage 33 formed axially in the shaft and extending from the bushing to the outer or front end of the shaft.

The flow of the liquid back and forth through the by-passes is regulated for varying the shock absorbing capacity of the instrument by means of a regulating valve 34 of steel or the like which is movable toward and from a front face or seat 35 on the bushing. This adjustment is effected manually from the exterior of the instrument by a rotatable plug 36 of steel or the like arranged within the outer end portion of the shaft and having a screw connection therewith, a valve stem 37 arranged lengthwise within the bore of the shaft and connected at its inner or rear end with the regulating valve 34 and connected at its front or outer end with the screw plug 36, an adjusting shank 38 extending from the screw plug through a stuffing box 39 in the shaft to the exterior of the same, and a finger piece or hand 40 applied to the outer end of the shank and adapted to be turned by hand for moving the regulating valve 34 at will toward and from the bushing for varying the capacity of the by-passes in order to obtain the desired shock absorbing effect.

In the absence of any provision to avoid it this shock absorber would offer greater resistance to the relative movement of the parts on the automobile with which it is associated in winter time or cold weather, than it would during summer time or warm weather, because in warm weather the liquid is thinner or more limpid and therefore flows faster through a conduit of a given capacity while during cold weather the liquid is thicker or more viscous and therefore flows slower or less freely through the same conduits. As a result the shock absorbing action is not uniform at all times under varying temperature conditions because the absorber is stiffer or more resistant in cold weather than in warm weather.

For the purpose of enabling the shock absorber to automatically adapt itself to variations in temperature, the same is so organized that it operates thermostatically in response to temperature changes.

This is preferably accomplished by making the valve stem 37 of a metal or alloy which has a greater rate or co-efficient of expansion and contraction than the body of the shock absorber and also making this stem of a comparatively small diameter so as to form a thermal chamber between this stem and the bore of the shaft into which the liquid can flow from the by-passes and thus act thermally upon the valve stem. If the shock absorber body is made of iron or steel the valve stem 37 can be made of any other material having a higher co-efficient of expansion and contraction such as copper, aluminum, brass, bronze, tin and zinc.

In such an organization the thermostatic valve stem will expand and lengthen as the temperature of the resistance liquid increases in warm weather, thereby causing the regulating valve to be moved nearer to its seat on the bushing and reduce the flow of the resistance liquid from one end of each pressure chamber to the other, in the same measure as the liquid becomes more limpid or thinner and capable of flowing more readily.

In like manner the thermostatic valve stem will contract or shorten as the temperature of the resistance liquid lowers in cold weather, thereby causing the regulating valve to be moved farther away from its seat on the bushing and thus increase the flow of the resistance liquid from one end of each pressure chamber to the other. It will have been apparent that by this means an automatic compensation is obtained in the shock absorber to suit the changing viscosity of the resistance liquid due to variations in temperature, thereby insuring uniform operation of the shock absorber regardless of changes in temperature and providing greater comfort for the passengers and also greater safety for the load in case the merchandise which is being transported requires careful handling.

It is to be understood that this invention comprehends the use of a thermostatic member of any metal, alloy or other material for automatically operating the regulating valve thermostatically, which member has a different co-efficient of expansion and contraction from the material of which the body and associated parts of the instrument are made and contribute to obtaining a thermostatic movement of the regulating valve.

Figure 3:
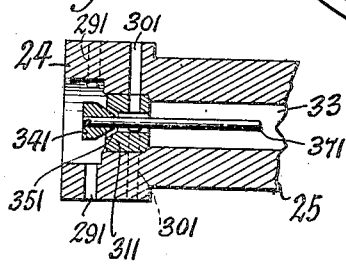
Figure 3 is a fragmentary longitudinal section showing a modified form of this invention as compared with the structure shown in Figs. 1 and 2.

For example, the body, piston, hub, shaft and bushing may be made of bronze or aluminum and the valve stem of steel or iron. In such a case as shown in Fig. 3 the ferrous metal stem 37¹ could be extended through the bushing 311 and provided with a regulating valve 341 movable toward and from a seat 351 on the rear side of the bushing for controlling the capacity of the by-passes 291, 301. If during warm weather the stem expands slower than the body of the instrument the effect would be to move the valve 341 toward the seat 351 and restrict the flow of the resistance liquid and vice-versa when the temperature increases.

In both forms of this invention the means for operating the regulating valve have a different rate of expansion and contraction from that of the material constituting the body of the instrument.

I claim as my invention:—

1. A shock absorber comprising a body having a chamber adapted to contain a resistance fluid and a bearing in a wall of said chamber, an oscillatory piston arranged in said chamber and provided with a hub and a shaft extending from said hub and journaled in said bearing, said hub having a conduit communicating with said chamber on opposite sides of said piston and adapted to carry said liquid back and forth at opposite ends of said chamber, and said shaft having an axial bore communicating with said passage, a valve arranged within said hub and adapted to control said passage, and a stem arranged lengthwise in said bore and connected at one end with said valve adjustably connected and at its other end with said shaft and constructed of a material having a lesser rate of expansibility than the material of said shaft.

2. A shock absorber comprising a body having a chamber adapted to contain a resistance fluid and a bearing in a wall of said chamber, an oscillatory piston arranged in said chamber and provided with a hub and a shaft extending from said hub and journaled in said bearing, said hub having a conduit communicating with said chamber on opposite sides of said piston and adapted to carry said liquid back and forth at opposite ends of said chamber, and said shaft having an axial bore communicating with said passage, a valve arranged within said hub and adapted to control said passage, a stem arranged lengthwise in said bore and connected at one end with said valve and at its other end with said shaft and constructed of a material having a lesser rate of expansibility than the material of said shaft and means for adjusting said valve relative to said conduit consisting of a plug connected with said stem and having a screw connection with said shaft.

3. A shock absorber comprising a body having a chamber adapted to contain a resistance fluid and a bearing in a wall of said chamber, an oscillatory piston arranged in said chamber and provided with a hub and a shaft extending from said hub and journaled in said bearing, said hub having a conduit communicating with said chamber on opposite sides of said piston and adapted to carry said liquid back and forth at opposite ends of said chamber, and said shaft having an axial bore communicating with said passage, a valve arranged within said hub and adapted to control said passage, a thermostatic stem arranged in said bore and connected at its inner end with said valve and at its outer end with said shaft and exposed to the liquid flowing through said passage and constructed of a material having a lesser rate of expansion and contraction than said shaft, and a rotatable member connected with said stem and having a screw connection with said shaft.

4. A hydraulic shock absorber for motor vehicles comprising a body having a chamber adapted to contain a resistance fluid and a bearing in a wall of said chamber, an oscillatory piston arranged in said chamber and provided with a hub and a shaft extending from said hub and journaled in said bearing, a piston extending from said hub for dividing said fluid chamber into a high pressure side and a low pressure side, said shaft having an axially extending valve chamber and a valve seat member at the inner end of said valve chamber having a port therethrough, a valve stem adjustably secured at its outer end to the outer end of said shaft and extending through said valve port and terminating outside of said port in a valve head, there being a passageway through said hub connecting the low pressure side of said chamber with the outer end of said valve port and a passageway connecting the high pressure side of said chamber with the inner end of said valve port whereby the pressure against said valve head by fluid flowing through said passages and valve port from the low pressure side to the high pressure side of said fluid chamber will subject said valve stem to tension.

5. A hydraulic shock absorber for motor vehicles comprising a body having a chamber adapted to contain a resistance fluid and a bearing in a wall of said chamber, an oscillatory piston arranged in said chamber and provided with a hub and a shaft extending from said hub and journaled in said bearing, a piston extending from said hub for dividing said fluid chamber into a high pressure side and a low pressure side, said shaft having an axially extending valve chamber and a valve seat member at the inner end of said valve chamber having a port therethrough, a valve stem adjustably secured at its outer end to the outer end of said shaft and extending through said valve port and terminating beyond said port in a valve head, there being a passageway through said hub connecting the low pressure side of said chamber with the outer end of said valve port and a passageway connecting the high pressure side of said chamber with the inner end of said valve port whereby the pressure against said valve head by fluid flowing through said passages and valve port from the low pressure side to the high pressure side of said fluid chamber will subject said valve stem to tension, said valve stem being of a material having a lesser rate of expansibility than the material of said shaft whereby increasing temperature will cause restriction of flow through said passageways.

In testimony whereof I hereby affix my signature.

ALBERT E. SHULTZ.